(12) United States Patent
Chen et al.

(10) Patent No.: US 9,580,823 B2
(45) Date of Patent: Feb. 28, 2017

(54) BIOMASS TRANSITION METAL HYDROGEN-EVOLUTION ELECTROCATALYSTS AND ELECTRODES

(71) Applicant: Brookhaven Science Associates LLC

(72) Inventors: Wei-Fu Chen, Ridge, NY (US); Shweta Iyer, Port Jefferson Station, NY (US); Shilpa Iyer, Port Jefferson Station, NY (US); Kotaro Sasaki, Hauppauge, NY (US); James T. Muckerman, Port Jefferson, NY (US); Etsuko Fujita, Port Jefferson, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 28 days.

(21) Appl. No.: 14/430,528

(22) PCT Filed: Oct. 1, 2013

(86) PCT No.: PCT/US2013/062887
§ 371 (c)(1),
(2) Date: Mar. 23, 2015

(87) PCT Pub. No.: WO2014/055533
PCT Pub. Date: Apr. 10, 2014

(65) Prior Publication Data
US 2015/0252484 A1   Sep. 10, 2015

Related U.S. Application Data

(60) Provisional application No. 61/708,364, filed on Oct. 1, 2012.

(51) Int. Cl.
*B01J 27/22* (2006.01)
*B01J 27/24* (2006.01)
(Continued)

(52) U.S. Cl.
CPC .......... *C25B 11/0415* (2013.01); *B82Y 30/00* (2013.01); *C01B 21/062* (2013.01);
(Continued)

(58) Field of Classification Search
CPC ............. C25B 11/0405; C25B 11/0447; C25B 11/0478; C01B 21/00; C01B 31/30;
(Continued)

(56) References Cited

U.S. PATENT DOCUMENTS 4,515,763 A * 5/1985 Boudart .................. B01J 27/22
423/409
5,200,060 A * 4/1993 Sajkowski ............... B01J 27/22
208/108
(Continued)

FOREIGN PATENT DOCUMENTS

WO        2012026539 A1    3/2012

OTHER PUBLICATIONS

Covington Jr., Leroy et al., "Production of Dispersed Molybdenum Nitride and Carbide Nanostructured Crystallites using Ultrasonic Irradiation", In: 5th Topical Conference on Nanoscale Science and Engineering, 2005 Annual Meeting, pp. 1-6.
(Continued)

*Primary Examiner* — Patricia L Hailey
(74) *Attorney, Agent, or Firm* — Dorene M. Price; Lars O. Husebo (57) ABSTRACT

A catalytic composition from earth-abundant transition metal salts and biomass is disclosed. A calcined catalytic composition formed from soybean powder and ammonium molybdate is specifically exemplified herein. Methods for making the catalytic composition are disclosed as are electrodes for hydrogen evolution reactions comprising the catalytic composition.

30 Claims, 5 Drawing Sheets

(51) Int. Cl.
B01J 37/04 (2006.01)
B01J 37/08 (2006.01)
B01J 37/14 (2006.01)
C25B 11/04 (2006.01)
C01B 31/30 (2006.01)
C01B 31/34 (2006.01)
C01B 21/06 (2006.01)
B82Y 30/00 (2011.01)
B01J 35/00 (2006.01)

(52) U.S. Cl.
CPC .......... C01B 31/301 (2013.01); C01B 31/303 (2013.01); C01B 31/305 (2013.01); C01B 31/34 (2013.01); C25B 11/0447 (2013.01); C25B 11/0478 (2013.01); *B01J 35/0033* (2013.01); *C01P 2002/72* (2013.01); *C01P 2002/76* (2013.01); *C01P 2004/64* (2013.01); *C01P 2006/16* (2013.01)

(58) Field of Classification Search
CPC ..... C01B 31/303; C01B 31/305; C01B 31/34; B01J 35/0033; B01J 27/22; B01J 27/24; B01J 35/006; B01J 35/023; B01J 35/1061; B01J 35/1066; B01J 37/04; B01J 37/08; B01J 37/14; C01P 2004/64; C01P 2006/16; C01P 2002/72

USPC ........................................ 502/101, 177, 200
See application file for complete search history.

(56) References Cited

U.S. PATENT DOCUMENTS

| 2005/0016839 | A1* | 1/2005 | Horne ................... C23C 16/403 204/242 |
| 2005/0165252 | A1 | 7/2005 | Kang et al. |
| 2008/0050792 | A1* | 2/2008 | Zmierczak ............. C10G 1/002 435/161 |
| 2012/0220451 | A1* | 8/2012 | Miyata ............... B01D 53/8628 502/174 |
| 2013/0045865 | A1* | 2/2013 | Thompson ............... B01J 37/08 502/177 |
| 2015/0038751 | A1* | 2/2015 | Ng ........................... B01J 23/88 585/313 |
| 2015/0105241 | A1* | 4/2015 | Roman-Leshkov ..... B01J 23/16 502/177 |

OTHER PUBLICATIONS

Ham, Dong Jin et al., "Transition Metal Carbides and Nitrides as Electrode Materials for Low Temperature Fuel Cells", Energies, 2009, vol. 2, pp. 873-899.
International Search Report, PCT/US13/62887, Jan. 8, 2014.

* cited by examiner

BIOMASS TRANSITION METAL HYDROGEN-EVOLUTION ELECTROCATALYSTS AND ELECTRODES

This application claims benefit of U.S. Provisional Application No. 61/708,364, filed Oct. 1, 2012, which application is incorporated herein by reference in its entirety.

This invention was made with Government support under contract number DE-ACO2-98CH 10886, awarded by the U.S. Department of Energy. The Government has certain rights in the invention.

BACKGROUND

Hydrogen represents a next generation energy carrier that can efficiently produce electricity from its chemical energy. Because of the depletion of fossil fuel reserves and the increasing $CO_2$ emissions, hydrogen is a promising power source for mobile and stationary applications. To fully commercialize proton exchange membrane (PEM) fuel cells, sustainable hydrogen production is indispensable. The conversion of water to hydrogen and oxygen ($2H_2O_{(l)} \rightarrow 2H_{2(g)} + O_{2(g)}$) (electrolysis) using carbon emission-free energy sources of electricity such as solar and wind power is a sustainable energy storage approach. Efficient hydrogen evolution reaction (HER) in acidic condition ($2H^+ + 2e^- \rightarrow H_2$) remains difficult without the use of platinum catalysts.

The U. S. Department of Energy (DOE) has set a cost goal for hydrogen at $2.00-3.00/kg, including production, delivery and dispensing, a level at which the DOE estimates that hydrogen will be cost competitive with petroleum fuels (Turner et al. (2008) International J. Energy Res. 32:379). According to a 2012 DOE report (Ayers (2012) *DOE annual merit review proceedings, Hydrogen and Fuel Cells Program*, Arlington, Va.), a large part of the premium on an industrial proton-exchange-membrane electrolyzer is the cost of the "membrane-electrode-assembly," and half of that cost is due to platinum. State-of-the-art hydrogen production costs about $4-5/kg based on Pt-catalyzed devices. The high cost of platinum ($1450/oz. in August 2012) and its scarcity makes its use an impediment to large-scale commercial application of proton-exchange-membrane electrolyzers.

A general approach for overcoming this obstacle is to reduce the use of noble metals or replace them with low cost non-precious catalysts. Previous Pt alternatives encountered barriers such as high activating voltage (Helm, et al. (2011) Science 333: 863; and Harnisch et al. (2009) App. Catalysis B: Environmental 89:455), low surface area (Merki et al. (2012) Chem. Sci. 3:2515), intrinsic resistance (Chen et al. (2011) Nano Letters 11:4168), or difficulties relating to production and scale up (LeGoff et al. (2009) Science 326:1384).

Molybdenum, one of the most abundant transition metals, contributes high corrosion resistance to stainless steel but has generally proven to be unsatisfactory in electrocatalytic activity towards hydrogen evolution. Accordingly, there has been an ongoing effort to find affordable hydrogen production routes based on molybdenum for water electrolysis (Karunadasa et al. (2012) Science 335: 698; Vrubel et al (2012) Energy. Environ. Sci. 5:6136; Chen et al. (2012) Ang. Chemie Int'nl. Ed. 51:6131), as well as for photoelectrochemical water splitting (McKone et al. (2011) Energy Environ. Sci. 4:3573; Seger et al. (2012) Ang. Chemie Int'nl. Ed. 51:9128).

Hence, there exists a bong standing need to provide tow-cost transition metal catalysts using simple environmentally friendly approaches.

SUMMARY OF THE INVENTION

The invention provides a catalytic composition having a nanocrystalline structure, wherein the catalytic composition is made of a transition metal carbide and a transition metal nitride.

In another aspect, the invention provides a method for preparation of a catalytic composition. The method involves: mixing a biomass with a transition metal in a suitable solvent to create a dispersed suspension of the biomass with the transition metal; drying the suspension; and calcining the dried suspension to form the catalytic composition.

In another aspect, the invention provides a catalytic composition manufactured by a process of calcining biomass in the presence of one or more transition metals.

In another aspect, the invention provides a method for forming an electrode, said method includes depositing the suspension of biomass and transition metal in a solvent onto a solid support or substrate to form a coated solid support, drying the coated support to remove said solvent, and thereafter subjecting the coated support to calcination.

In another aspect, the invention provides an electrode having a transition metal carbide and a transition metal nitride coated onto a solid support and calcined thereon to form an electrode comprising the catalytic composition.

DETAILED DESCRIPTION

The catalytic composition includes a transition metal carbide and a transition metal nitride. An electrode having the metal carbide and the metal nitride is provided. A method of making the catalytic composition and electrode having the metal carbide and the metal nitride is also provided.

In one aspect, the present catalytic composition includes a composite nanocrystalline material having a metal carbide and a metal nitride. The metal carbide and metal nitride each include a transition metal. Metal carbide is defined herein as a carbide containing a transition metal. A metal nitride is defined herein as a nitride containing a transition metal.

The transition metal for either the carbide or the nitride, or for both, may be molybdenum (Mo), tungsten (W), titanium (Ti), cobalt (Co), nickel (Ni), copper (Cu), iron (Fe), niobium (Nb), tantalum (Ta), chromium (Cr), or mixtures thereof. The transition metal may be a group IV transition metal or mixtures thereof. The transition metal may be a group V transition metal or mixtures thereof. The transition metal may be a group VI transition metal or mixtures thereof. The transition metal may be a group VII transition metal or mixtures thereof. The transition metal may be a group VIII transition metal or mixtures thereof. The transition metal may be a mixture of transition metals from each of the aforementioned groups. Preferred transition metals include Mo, W, Co, Ni, Cu, Ti, and Fe. Even more preferred transition metals include Mo, W, and Co. Still more preferred transition metals include Mo and W.

The metal carbide and metal nitride are each nanocrystalline and aggregate to form grains. Specifically, the grains aggregate to form three-dimensional (3-D) porous composites in which the metal carbide and metal nitride maintain their nanocrystalline structure. The 3-D porous composite comprises the catalytic composition.

In a preferred embodiment, the minimum average nanocrystalline grain size of the catalytic composition is 1 nm. In a more preferred embodiment, the minimum average grain size is 5 nm; even more preferably, the minimum average grain size is 10 nm.

In a preferred embodiment, the maximum average grain size of the catalytic composition is 500 nm. In a more preferred embodiment, the maximum average grain size is 150 nm; even more preferably, the maximum average grain size is 100 nm.

The average size of the grains of the catalytic composition ranges between 1 nm and 500 nm. In another embodiment, the average size of the grains of the catalytic composition ranges between 5 nm and 250 nm and even more preferred example, the average size of the grains is between 5 nm and 100 nm.

In one embodiment, the minimum average pore size of the catalytic composition is 1 nm. In a preferred embodiment, the minimum average pore size is 10 nm; even more preferably, the minimum average pore size is 20 nm.

In one embodiment, the maximum average pore size of the catalytic composition is 500 nm. In a preferred embodiment, the maximum average pore size is 250 nm; even more preferably, the maximum average pore size is 100 nm.

For example, the catalytic composition comprises pores having an average pore size in the range of 10 nm and 500 nm; and in another example, the catalytic composition comprises pores having an average size in the range of 10 nm to 250 nm. In another example, the catalytic composition comprises pores having an average size range of 20 to 100 nm.

In an embodiment, the minimum weight ratio of metal carbide to metal nitride in the catalytic composition is 0.1:1. In a preferred embodiment, the minimum weight ratio is 0.5:1; even more preferably, the minimum weight ratio is 1:1.

In an embodiment, the maximum weight ratio of metal carbide to metal nitride in the catalytic composition is 10:1. In a preferred embodiment, the maximum weight ratio is 5:1; even more preferably, the maximum weight ratio is 2:1.

In an embodiment of the catalytic composition, the metal carbide nanocrystalline grains have an average grain size in between 1 nm and 100 nm and the metal nitride nanocrystalline grains have an average grain size range in between 1 nm and 100 nm.

In a preferred embodiment, the metal carbide is $\beta$-$Mo_2C$ and the metal nitride is $\gamma$-$Mo_2N$. In yet another preferred embodiment, the composition is an aggregate of grains of tetragonal $\gamma$-$Mo_2N$ and orthorhombic $\beta$-$Mo_2C$ nanocrystals.

In a preferred embodiment, the $\beta$-$Mo_2C$ nanocrystal grains have an average size between 1 nm and 100 nm. In another preferred embodiment, the $\gamma$-$Mo_2N$ nanocrystal grains have an average size between 1 nm and 100 nm. The grains made of $\gamma$-$Mo_2N$ and $\beta$-$Mo_2C$ nanocrystals form composites having pores with an average pore size of 100 nm.

In another aspect, a method for preparing the catalytic compositions described above is provided. Said method involves mixing a biomass with a transition metal, or transition metal salt, in a suitable aqueous solvent to create a dispersed suspension of the biomass with the transition metal, or transition metal salt; and subjecting the mixture to calcination.

As defined herein, a biomass is defined as any whole plant, portion of a plant, or product of a plant. Non-limiting examples of biomass include leaves, stems, flowers, seeds or nuts of plants, but more preferably includes seeds or nuts of plants. The biomass may be from angiosperms or gymnosperms. Of the angiosperm biomass, leguminous plant seeds or nuts are preferable. The leguminous biomass seeds or nuts may be, for example, soybean, peanut, chickpea, broad bean, cowpea, alfalfa, lentil, or mixtures thereof. The protein composition of the biomass may be greater than 10%, more preferably greater than 20%, and still more preferably greater than 30%.

A preferable biomass is a leguminous seed or nut in either natural (fresh) or dried form. Natural refers to an "as harvested," "wet" biomass; and dried refers to biomass from which moisture has been allowed to escape or from which moisture was actively encouraged to escape or be removed by a drying process. Leguminous seeds or nuts having protein compositions in excess of 20% are preferable to those having lower amounts of protein. In another embodiment, the biomass is soybeans. Generally, and particularly in the case of nuts or seeds of leguminous plants, a dried form may be obtained through any of the processes used for preservation, for storing, for marketing, and/or for subsequent planting seasons that are known in the art.

Drying may be accomplished by any known means. For example, a drum dryer or spray dryer may be used.

The biomass, in natural, in fresh form or in dried form, is ground into a slurry or powder, respectively. Grinding may be accomplished by any known means. Grinding may be accomplished for example by manual or automated means; such as for example, with a mortar and pestle or electric grinder.

The transition metal for either carbide or nitride may be molybdenum (Mo), tungsten (W), titanium (Ti), cobalt (Co), nickel (Ni), copper (Cu), iron (Fe), niobium (Nb), tantalum (Ta), chromium (Cr), or mixtures thereof, or salts thereof and mixtures of such salts. The transition metal, or salt thereof, may be a group IV transition metal or mixtures of group IV transition metals. The transition metal, or salt thereof, may be a group V transition metal or mixtures of group V transition metals. The transition metal, or salt thereof, may be a group VI transition metal or mixtures of group VI transition metals. The transition metal, or salt thereof, may be a group VII transition metal or mixtures of group VII transition metals. The transition metal, or salt thereof, may be a group VIII transition metal or mixtures of group VIII transition metals. The transition metal may be a mixture of transition metals or transition metal salts from each of the aforementioned groups.

In a preferred embodiment, the transition metal is a salt of Mo, salt of W, or mixtures of the two salts. In another preferred embodiment, the transition metal salt is ammonium molybdate. In yet another preferred embodiment, the transition metal salt is ammonium heptamolybdate.

As previously described, biomass and transition metal may be suspended by, for example, mixing in the presence of a suitable solvent. An aqueous solvent that is compatible with the biomass and transition metal, or transition metal salt, may be used. In a preferred embodiment, the aqueous solvent may be pure water (e.g., distilled or deionized water), but may also include water-miscible alcohols.

The suspension of biomass and transition metal, or transition metal salt, is mixed together. The biomass described above is mixed with the transition metal, or transition metal salt, under conditions that provide adequate mixing to distribute the transition metal, or transition metal salt, evenly throughout the suspension. Suitable conditions are those that cause turbulence or shearing in the suspension. Sufficient time for mixing may be readily determined by one skilled in the art, depending on the characteristics of the biomass and transition metal suspension. In a preferred embodiment, mixing of the suspension is accomplished by sonication.

In an embodiment of the catalytic composition method, the minimum weight ratio of biomass to transition metal, or transition metal salt, to be calcined is 0.1:1. In another preferred embodiment, the minimum weight ratio of biomass to transition metal is 0.5:1; even more preferably, the minimum weight ratio is 1:1.

In an embodiment, the maximum weight ratio of biomass to transition metal, or transition metal salt, to be calcined is 10:1. In a preferred embodiment, the maximum weight ratio is 5:1; even more preferably, the maximum weight ratio is 2:1.

The weight ratio for the catalytic composition is based upon the weight ratio of the biomass to the transition metal, or transition metal salt, that are initially mixed together in the preparation for calcining to form the catalytic composition; and not on the weight ratio of the materials in the final catalytic composition that is produced during the calcining process.

The optimal specific weight ratio of biomass to transition metal, or transition metal salt, will vary depending upon the nature of the biomass (e.g., whether "fresh weight" or "dried weight" in addition to the source of the biomass) and the composition of the transition metal salt (i.e., the specific counterion, the oxidation state of the transition metal and the extent of hydration). Once an optimal weight ratio of a particular biomass and a particular transition metal salt is determined, specific routine adjustments are readily made to take into account the variety of readily available transition metal counterions or the "fresh" or "dry" state of the biomass and such optimizations are not to be considered out of the scope of the catalytic compositions disclosed herein.

The suspension of transition metal and biomass is dried to remove the solvent before calcining. Dried means that the suspension is substantially free of solvent. Drying may be accomplished by any means known in the art. The drying may take place at room temperature or elevated temperature for a time sufficient to allow the suspension to dry.

In a preferred embodiment, the biomass and transition metal suspension is dried at 80° C. for 1-10 hours. A person of ordinary skill in the art would understand that the relative temperature and time for drying can be varied without significantly altering the formation or the nature of the final catalytic composition.

In another preferred embodiment, particularly for the formation of electrodes, the suspension is coated on and dried onto a solid support or substrate. Examples of suitable substrates include: carbon fiber paper, carbon paper, metallic mesh, glass, carbon cloth, Si wafers, or graphene. For coating on a substrate, the transition metal and biomass suspension is coated on the desired substrate, and dried. To increase the amount of suspension dried onto the substrate, multiple steps of applying the suspension and allowing it to dry may be repeated until the desired amount of biomass and transition metal are present on said substrate.

The dried suspension is calcined, as previously described, to produce the catalytic composition. The solid state calcination of the biomass in the presence of a transition metal converts the mixture to a powdery substance that is the catalytic composition. The calcination involves heating the dried suspension at a temperature below the melting temperature of the transition metal, or transition metal salt, and below the melting temperature of the biomass. The temperature is preferably between the temperature required for decomposition of either the transition metal salt, or the biomass and the temperature at which the catalytic composition decomposes.

A person of ordinary skill in the art would understand that the relative temperature and time for calcination can be varied, and still allow adequate calcination of the biomass and transition metal mixture. Furthermore, a person of ordinary skill in the art would understand that the conditions can be altered to adjust the physical characteristics of the catalytic composition.

Calcining is performed in an inert atmosphere, such as argon or nitrogen. In a preferred embodiment, calcining occurs under a nitrogen or argon purge.

In a preferred embodiment the biomass is dried soybeans, and the transition metal salt is ammonium molybdenum. The dried suspension of ammonium molybdate and ground soybean is calcined at a temperature range between 700° C. and 900° C. for between 5 and 10 hours in an argon atmosphere.

In another embodiment, a preferable catalytic composition is prepared by calcining a weight of biomass with an equal weight of a transition metal, or transition metal salt. A particular exemplification of a preferable catalytic composition is prepared by calcining equal weights of biomass and ammonium molybdate in the form of $((NH_4)_6Mo_7O_{24} \cdot 4H_2O)$ (ammonium heptamolybdate).

In another aspect, a method is provided for forming an electrode comprising the catalytic composition as described above.

In said method, a suspension having a biomass and transition metal, as described above, is coated on a solid support or substrate; the coated solid support is dried; and the biomass and transition metal coated solid support is calcined.

To prepare the electrode, a substrate is provided. Many suitable substrates for use as electrocatalyst supports for electrodes are known in the art. Any suitable substrate compatible with an electrochemical cell may be used. In a preferred embodiment, the substrate is compatible with the use of the electrode in nominally to very acidic conditions. In another preferred embodiment, the substrate is compatible in water electrolysis for the production of hydrogen and oxygen.

Substrates known in the art are preferably highly porous, chemically inert, electrically conductive materials having a large amount of surface area per unit volume of material and pores sufficiently large to allow easy penetration of the catalytic composition. The electrode substrate may be made in the form of perforated material, felt, metal strands, metal mesh, or other forms.

Non-limiting examples of suitable substrates include carbon fiber paper, carbon paper, metallic mesh, glass, carbon cloth, Si wafers, or graphene. A metallic mesh can be woven, knitted, welded, expanded, photo-chemically etched or electroformed (screen filter) from steel or other metals.

The catalytic composition is adhered, adsorbed, or attached to the above-mentioned substrate by any means known in the art. Examples of methods to adhere, adsorb, or attach the composite to the substrate include the hot melt technique or the polymeric solution technique.

In a preferred embodiment, the catalytic composition is formed, as described above, and then attached in a desired amount to the substrate.

In a preferred embodiment, the catalytic composition is formed on the substrate. In this technique, a suspension of ground biomass and transition metal is assembled in a suitable solvent, as described above. The suspension is applied to a substrate forming a coating, as described above, and allowed to dry. In one example, the substrate and coating may be dried in an oven at 80° C. for 1 hour.

To increase the amount of biomass and transition metal on the surface of the solid support, repeated applications the biomass and transition metal suspension followed by drying periods may be performed until the desired amount of biomass and transition metal is applied.

Once the desired amount of biomass and transition metal has been applied to the solid support, the solid support coated with the biomass and transition metal is calcined as described above.

EXAMPLES

Example 1

Preparation of Catalytic Compositions

Figure 2:
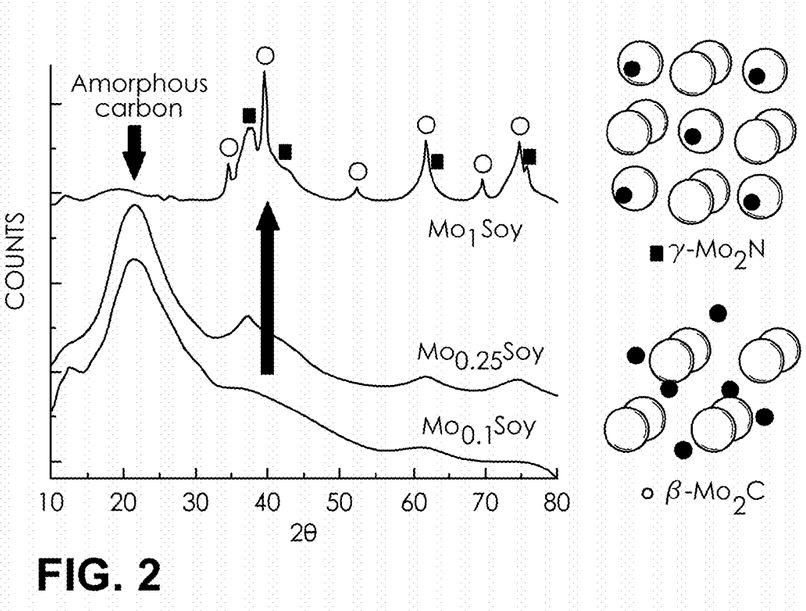
FIG. 2 illustrates the X-ray diffraction patterns for the catalytic compositions $Mo_{0.1}Soy$, $Mo_{0.25}$ Soy, and $Mo_1Soy$.
Figure 3:
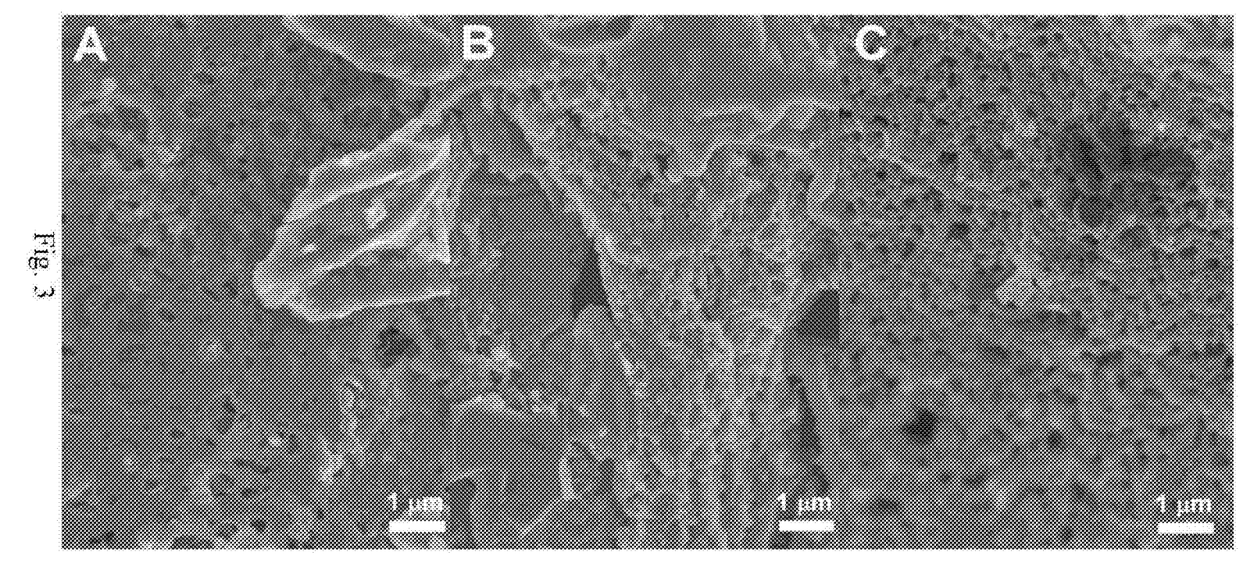
FIG. 3 illustrates scanning electron micrographs of $Mo_{0.1}Soy$ (A), $Mo_{0.25}$ Soy (B), and $Mo_1Soy$ (C).

Dry, organic soybeans were purchased from a supplier of organic foods (Whole Foods Market) and were ground to a powder. The powdered soybean (biomass) and ammonium molybdate $((NH_4)_6Mo_7O_{24}\cdot 4H_2O)$ were suspended together in water using a variety of weight ratios of the biomass to the Mo salt, as shown in FIGS. 2 and 3. The suspensions were sonicated and then dried at 80° C. for 5 to 10 hours. The dried materials were calcined at 800° C. under argon in a tube furnace. Dark grey powder catalytic compositions ($Mo_x$Soy, x: weight ratio of Mo salt to soybean powder) were obtained. These catalytic compositions may be stored for later use.

The labeling on the soybeans packages used for this work reported that the soybeans contained about 12 g of protein for each 30 g of soybean—roughly a 40% protein composition.

Example 2

Coating on a Surface

For coating $Mo_x$Soy on a surface or substrate, the coating takes place before the calcination. Taking carbon paper as an example, the suspension (raw soybean powder and ammonium molybdate in water) was applied directly onto the paper, and dried in an oven at 80° C. for 1 h. Then the coated paper was placed in a quartz tube furnace and was calcined at 800° C. for 2 hours under argon. The same procedure was carried out on carbon cloths, stainless steel meshes and Si wafers.

Example 3

Evaluation of $Mo_x$Soy electrodes

Figure 1:
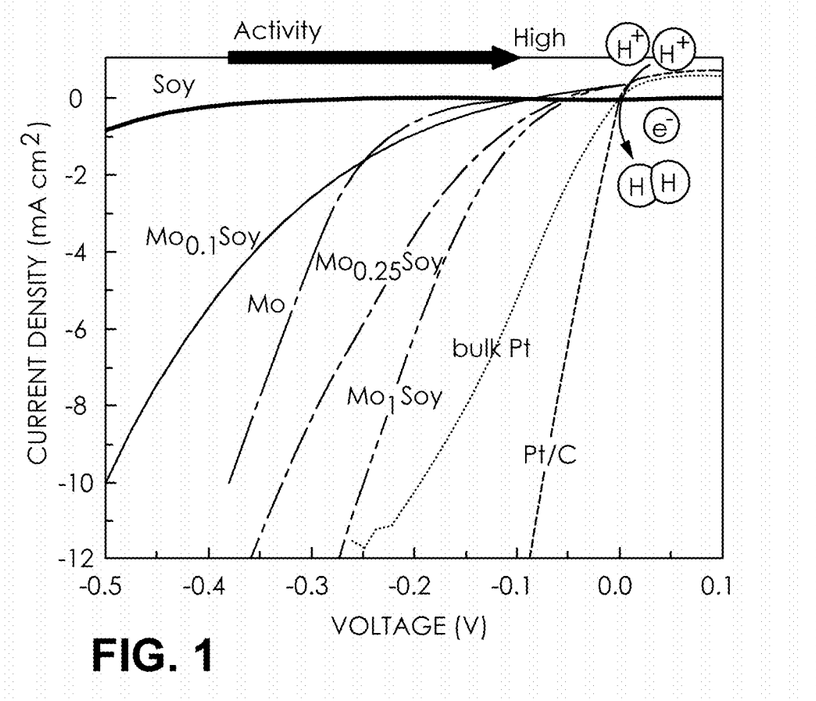
FIG. 1 illustrates the polarization curves for hydrogen evolution reaction for various catalytic materials, including the catalytic compositions.

To evaluate hydrogen evolution reaction (HER) performance, a series of $Mo_x$Soy catalyst carbon paper "electrodes" (x=0.1, 0.25, and 1)was exposed to $H_2$-saturated 0.1M $HClO_4$ solution in a standard three-electrode electrochemical cell at room temperature. FIG. 1 reports the current densities obtained during a linear sweep voltammetry experiment of the $Mo_x$Soy catalysts (catalyst loading: 8 mg $cm^{-2}$) coated on a carbon paper (Toray TGP-H-060). A reductive process is observed as the voltage is applied below −0.05 V for the $Mo_1$Soy catalyst. Hydrogen bubbles evolved more vigorously on the electrode having $Mo_x$Soy with higher values of x. As a control experiment, a commercial Pt/C catalyst (E-TEK 20 wt % Pt/XC-72), a bulk Pt disk and a Mo metal disk were also examined. The Pt/C catalyst exhibited high HER catalytic performance with a small overvoltage (7710, defined as the voltage at 10 mA $cm^{-2}$ of cathodic current density) of 75 mV. As a point of reference 10 mA $cm^{-2}$ was chosen because it is the current density that roughly corresponds to a 10% solar-to-hydrogen conversion efficiency in a solar water splitting device (Chen, et al. (2010) J. Mater. Res. 25:3). The voltammetry curve recorded with bulk platinum electrode and bulk molybdenum electrode showed overvoltage of 200 mV and 380 mV, respectively, for the HER. In contrast, the $Mo_1$Soy catalyst exhibits a n10 value of 248 mV, far exceeding pure Mo metal, and rivaling the performance of the bulk Pt. At overvoltages higher than 280 mV, the $Mo_1$Soy catalyst further shows enhanced current density that overtakes the bulk platinum. These voltammograms demonstrate that soybeans reduce the energy input for activating HER on the coupled molybdenum and favor proton reduction kinetics.

Example 4

Characterization of the Catalyst Composition

X-ray diffraction (XRD) was used to characterize the bulk crystal structure and average grain size of as-synthesized $Mo_1$Soy catalysts. In FIG. 2, the XRD patterns are seen to be consistent with tetragonal γ-$Mo_2$N (JCPDS-PDF 25-1368) and orthorhombic β-$Mo_2$C (JCPDS-PDF 77-0720) structures. It was found that the peak at 2θ=22° due to amorphous carbon is substantially reduced when Mo ratio increases, and the signals for γ-$Mo_2$N and β-$Mo_2$C phases are enhanced simultaneously. These results provide strong evidence of a solid-state reaction between the molybdate and the soybeans. The grain sizes for the β-$Mo_2$C and the γ-$Mo_2$N phases calculated by the XRD data are 9 nm and 6 nm, respectively (based on the (211) peak of β-$Mo_2$C and the (111) peak of γ-$Mo_2$N).

To explore the micro-morphology of the $Mo_1$Soy catalysts, scanning electron microscopy (SEM) was used. In FIG. 3, the SEM images display morphological transformation from a bulk material with a few pores for the $Mo_{0.1}$Soy to a highly porous 3D structure with average pore size of 100 nm for the $Mo_1$Soy.

Figure 4:
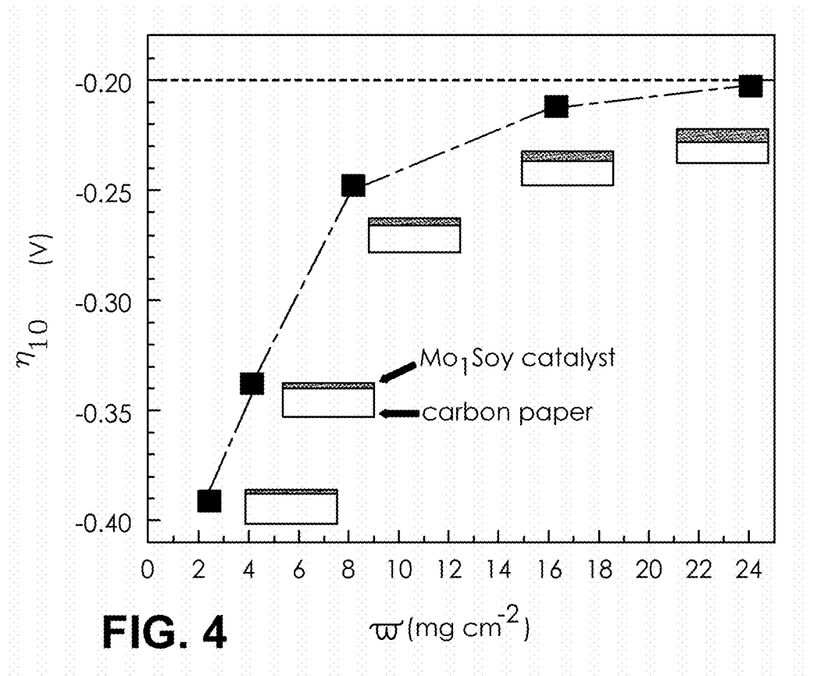
FIG. 4 illustrates the overvoltage to drive 10 mA/cm$^2$ on catalyst-coated carbon paper having increasing amounts of the $Mo_1Soy$ catalytic composition.

Further evidence of the porous character of the $Mo_{0.1}$Soy catalyst is provided by changing the catalyst loading on a specific geometric area. FIG. 4 presents the overvoltage, rim collected as a function of $Mo_1$Soy loading density up 24 mg $cm^{-2}$ (geometric). The values arm further shifts upward to nearly −0.2 V, which is in excess of the state-of-the-art performance in a limited geometric area on other nonprecious metal catalysts. This loading-dependent activity of the $Mo_1$Soy electrode is apparently because its robust 3-D architecture provides highly accessible reactive sites for proton reduction; this behavior is not seen on other thin-film or flat electrode systems.

Figure 5A:
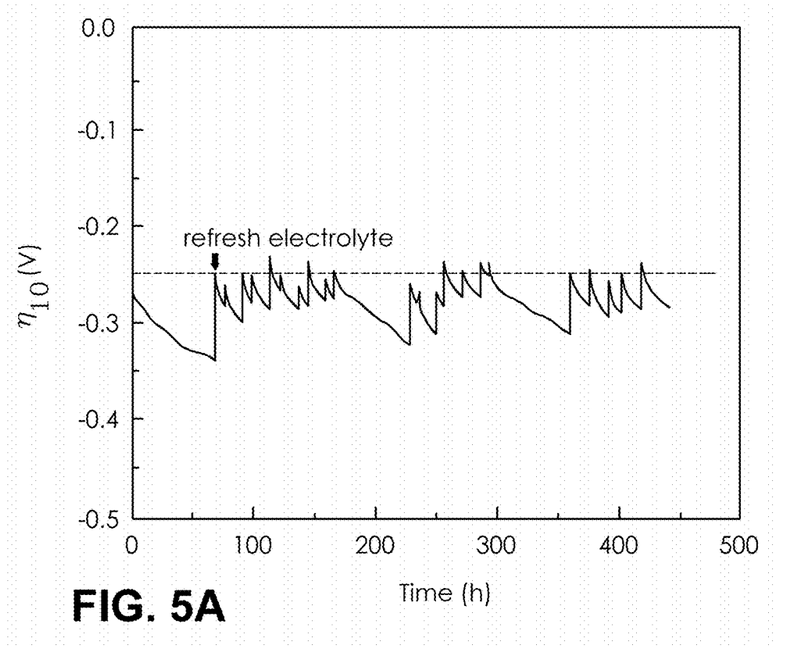
FIG. 5 illustrates the results of long-term durability testing of the 8 mg/cm$^2$ coated carbon paper electrode (A) and the corresponding HER polarization curves collected at various times during the long-term testing (B).
Figure 5B:
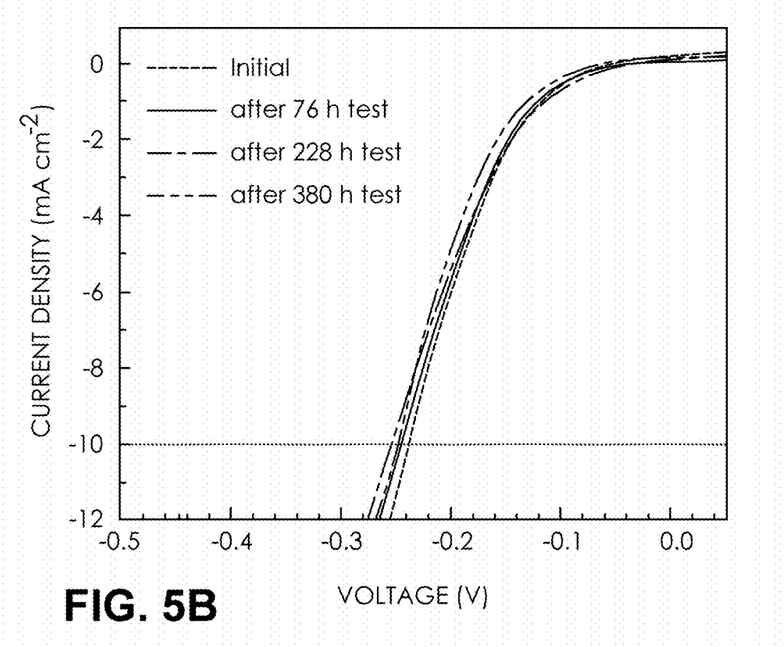

A significant problem facing hydrogen production for non-noble-metal catalysts is the deterioration of activity in acidic environments, owing to their poor corrosion stability. To determine whether the $Mo_xSoy$ catalysts achieve this essential requirement, we carried out long-term test in Ar-purged 0.1M $HClO_4$ solution. FIG. 5a depicts the overvoltage recorded for driving 10 mA cm$^{-2}$ of current density. The electrolyte solution was refreshed occasionally. The overvoltage increases with operating period, however, once the electrolyte is refreshed the overvoltage returns to the initial value at around 0.25 V. This phenomenon maintains even after 500 hours operation. FIG. 5b shows the polarization curves recorded in a $H_2$-purged fresh 0.1M $HClO_4$ solution occasionally during the long-term test. In good agreement with the long-term overvoltage test, the $Mo_1Soy$ catalyst, after 500 hours, retains almost identical polarization curves to that collected initially. These results provide evidence that nitridation and carburization give an excellent stabilizing effect against corrosion by acids.

While not wishing to be bound by any particular hypothesis regarding the performance of the $Mo_1Soy$ catalyst composition (biomass calcined with transition metal), it is proposed that first, the reactant, ammonium heptamolybdate, undergoes thermal decomposition steps to give $MoO_3$. A subsequent solid-state reaction between the $MoO_3$ and the amino ligands of soybean proteins leads to the formation of $\gamma$-$Mo_2N$ and carbon elements transform molybdenum into stable $\beta$-$Mo_2C$. The presence of nitrogen and carbon elements at the vicinity of the catalytic molybdenum center facilitates the formation of hydrogen from water. Results examining separate preparations of $\gamma$-$Mo_2N$ versus $\beta$-$Mo_2C$ suggest a synergy between the $\gamma$-$Mo_2N$ and the $\beta$-$Mo_2C$ adds to the activity and stability of the $Mo_1Soy$.

In the specification, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Throughout this specification, quantities are defined by ranges, and by lower and upper boundaries of ranges. Each lower boundary can be combined with each upper boundary to define a range. The lower and upper boundaries should each be taken as a separate element.

Reference throughout this specification to "one embodiment," "an embodiment," "one example," or "an example" means that a particular feature, structure or characteristic described in connection with the embodiment or example is included in at least one embodiment of the present embodiments. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

In this specification, groups of various parameters containing multiple members are described. Within a group of parameters, each member may be combined with any one or more of the other members to make additional sub-groups. For example, if the members of a group are a, b, c, d, and e, additional sub-groups specifically contemplated include any one, two, three, or four of the members, e.g., a and c; a, d, and e; b, c, d, and e; etc.

The invention claimed is:

1. A catalytic composition, said composition comprising a nanocrystalline structure comprising a transition metal carbide having an average grain size between 1 nm and 100 nm and a transition metal nitride having an average grain size between 1 nm and 100 nm.

2. The catalytic composition of claim 1, wherein the metal carbide and the metal nitride nanocrystals have a weight ratio between 0.1:1 and 10:1.

3. The catalytic composition of claim 1, wherein the composition comprises pores having an average pore size between 20 nm and 250 nm.

4. The catalytic composition of claim 1, wherein the metal is selected from the group consisting of Mo, W, Ti, Co, Ni, Cu, Fe, and mixtures thereof.

5. The catalytic composition of claim 1, wherein the metal nitride is $\gamma$-$Mo_2N$ and the metal carbide is $\beta$-$Mo_2C$.

6. The catalytic composition of claim 5, wherein the $\beta$-$Mo_2C$ crystals are orthorhombic and the $\gamma$-$Mo_2N$ crystals are tetragonal.

7. A method for preparation of a catalytic composition, said method comprising:
   mixing a biomass with a transition metal in a suitable solvent to create a dispersed suspension of the biomass with the transition metal;
   drying the suspension; and
   calcining the dried suspension to form the catalytic composition.

8. The method of claim 7, wherein the transition metal comprises one or more transition metal salts.

9. The method of claim 8, wherein the transition metal salt is selected from the group consisting of Mo, W, Ti, Co, Ni, Cu, Fe, and mixtures thereof.

10. The method of claim 9, wherein the transition metal salt is selected from the group consisting of Mo salts, W salts, and mixtures thereof.

11. The method of claim 10, wherein the transition metal salt is a Mo salt.

12. The method of claim 11, wherein the Mo salt is ammonium molybdate.

13. The method of claim 7, wherein calcination takes place in an inert atmosphere.

14. The method of claim 7, wherein the biomass is selected from the group consisting of soybean, peanut, chickpea, broad bean, cowpea, alfalfa, lentil, and mixtures thereof.

15. The method of claim 7, wherein the biomass comprises greater than 10% protein.

16. The method of claim 7, comprising a biomass to transition metal salt weight ratio is between 0.1:1 and 10:1.

17. A catalytic composition manufactured by a process of calcining biomass in the presence of one or more transition metal salts.

18. The catalytic composition of claim 17, wherein the biomass is selected from the group consisting of soybean, peanut, chickpea, broad bean, cowpea, alfalfa, lentil, and mixtures thereof.

19. The catalytic composition of claim 17, wherein the biomass comprises greater than 10% protein.

20. The catalytic composition of claim 17, wherein the transition metal salt is selected from the group consisting of salts of Mo, W, Ti, Co, Ni, Cu, Fe, and mixtures thereof.

21. The catalytic composition of claim 20, wherein the transition metal salt is selected from the group consisting of Mo salts, W salts, or mixtures thereof.

22. The catalytic composition of claim 21, wherein the transition metal salt is a Mo salt.

23. The catalytic composition of claim 17, comprising a biomass to transition metal salt weight ratio is between 0.1:1 and 10:1.

24. The catalytic composition of claim 17, wherein the transition metal salt is ammonium molybdate.

25. A method for forming an electrode, said method comprising depositing the suspension of biomass and transition metal onto a solid support to form a coated solid support, drying the coated support to remove said solvent, and thereafter subjecting the coated support to calcination.

26. The method of claim 25, further comprising repeating said depositing and drying steps wherein depositing the suspension occurs more than once, each time followed by drying.

27. The method according to claim 25, wherein the solid support is selected from the group consisting of carbon paper, metallic mesh, glass, graphene, or carbon cloth.

28. An electrode comprising a catalytic composition, said composition comprising a transition metal carbide and a transition metal nitride coated onto a solid support and calcined thereon.

29. The electrode according to claim 28, wherein the transition metal carbide is $\beta\text{-Mo}_2C$ and the transition metal nitride is $\gamma\text{-Mo}_2N$.

30. The electrode according to claim 28, wherein the solid support is graphene.

* * * * *